United States Patent
Verschuur et al.

(10) Patent No.: US 10,576,454 B2
(45) Date of Patent: Mar. 3, 2020

(54) MOULDABLE DESICCANT COMPOSITION

(71) Applicant: BELISARIUS B.V., Capelle aan den Ijssel (NL)

(72) Inventors: Marco Verschuur, Capelle aan den Ijssel (NL); Sander Van Loon, Capelle aan den Ijssel (NL)

(73) Assignee: BELISARIUS B.V., Capelle aan den Ijssel (NL)

( * ) Notice: Subject to any disclaimer, the term of this patent is extended or adjusted under 35 U.S.C. 154(b) by 88 days.

(21) Appl. No.: 15/670,211

(22) Filed: Aug. 7, 2017

(65) Prior Publication Data

US 2018/0050320 A1    Feb. 22, 2018

(30) Foreign Application Priority Data

Aug. 19, 2016 (EP) ................... 16185005

(51) Int. Cl.
| | | |
|---|---|---|
| B01J 20/26 | (2006.01) | |
| B01J 20/12 | (2006.01) | |
| B01J 20/14 | (2006.01) | |
| B01J 20/16 | (2006.01) | |
| B01J 20/24 | (2006.01) | |
| B01J 20/10 | (2006.01) | |
| B01D 53/28 | (2006.01) | |
| B01J 20/18 | (2006.01) | |
| B01J 20/04 | (2006.01) | |
| B01J 20/28 | (2006.01) | |
| B01J 20/30 | (2006.01) | |
| B01J 20/34 | (2006.01) | |

(52) U.S. Cl.
CPC ......... B01J 20/262 (2013.01); B01D 53/28 (2013.01); B01J 20/046 (2013.01); B01J 20/10 (2013.01); B01J 20/103 (2013.01); B01J 20/12 (2013.01); B01J 20/14 (2013.01); B01J 20/16 (2013.01); B01J 20/18 (2013.01); B01J 20/24 (2013.01); B01J 20/261 (2013.01); B01J 20/28026 (2013.01); B01J 20/3007 (2013.01); B01J 20/3441 (2013.01); B01D 2253/106 (2013.01); B01D 2253/108 (2013.01); B01D 2253/11 (2013.01); B01D 2253/112 (2013.01); B01D 2253/202 (2013.01); B01D 2259/40094 (2013.01); B01J 2220/46 (2013.01)

(58) Field of Classification Search
CPC ................................................ B01J 20/262
See application file for complete search history.

(56) References Cited

U.S. PATENT DOCUMENTS

| | | | |
|---|---|---|---|
| 2,356,890 A | 8/1944 | Schulze | |
| 2,967,153 A | 1/1961 | Houston | |
| 3,520,242 A * | 7/1970 | Kemp | B32B 27/00 430/159 |
| 3,773,776 A * | 11/1973 | Iler | C08K 3/36 524/493 |
| 4,615,823 A | 10/1986 | Tokuyama et al. | |
| 6,110,601 A * | 8/2000 | Shaw-Klein | B41M 5/52 347/106 |
| 2003/0194516 A1 | 10/2003 | Payne | |

FOREIGN PATENT DOCUMENTS

| | | | |
|---|---|---|---|
| CN | 103205412 A * | 7/2013 | |
| EP | 0832686 A2 | 1/1998 | |
| EP | 0860471 A1 | 8/1998 | |
| JP | 60046294 A * | 3/1985 | B41M 5/42 |
| WO | 01/08784 A1 | 2/2001 | |
| WO | 03018175 A1 | 3/2003 | |
| WO | 2014/051652 A1 | 4/2014 | |

OTHER PUBLICATIONS

English abstract of CN-103205412-A (Year: 2013).*
English abstract of JP-60046294-A (Year: 1985).*

* cited by examiner

*Primary Examiner* — Peter F Godenschwager
(74) *Attorney, Agent, or Firm* — Hudak, Shunk & Farine Co. LPA

(57) ABSTRACT

A reaction product of a mixture of components suitable for molding into shaped desiccant particles, wherein the mixture includes:
a. a porous siliceous material,
b. hygroscopic salt,
c. polyvinyl alcohol (PVA) with a degree of hydrolysis between 82 and 95 mol % and a viscosity between 12 and 40 mPa·s, as determined on an aqueous solution of 4% PVA at 20° C. according to DIN53015,
d. water,
e. optionally, an OH-containing polymer, different from PVA,
wherein the weight ratio between hygroscopic salt and the porous siliceous material is chosen between 0.1:1 and 0.9:1 and
wherein the weight ratio between hygroscopic salt and PVA is chosen between 1:1 and 5:1.

8 Claims, No Drawings

MOULDABLE DESICCANT COMPOSITION

FIELD OF THE INVENTION

The invention is directed to a moldable desiccant composition, to a process for making a desiccant and to a molded desiccant.

BACKGROUND OF THE INVENTION

A desiccant is a hygroscopic substance that induces or sustains a state of dryness (desiccation) in its vicinity. Commonly known pre-packaged desiccants are solids that adsorb water. These desiccants can, for example, comprise silica, activated charcoal, calcium sulfate, calcium chloride, and molecular sieves (typically zeolites).

In many desiccants combinations of several moisture adsorbing materials are used. A desiccant comprising several moisture adsorbing materials is also known as a composite desiccant.

Desiccants comprising several moisture adsorbing materials are for example described in WO2001/08784 and WO2014/051652.

WO2001/08784 describes a composition comprising a hygroscopic material dispersed in polyvinyl alcohol (PVA). In WO2001/08784 is mentioned that PVA has desiccating properties. PVA is combined with a hygroscopic material, like for example calcium chloride, phosphorous oxide, sodium silicate, potassium silicate, potassium acetate, bentonite, montmorillonite clay, silica gel, molecular sieve, monohydric compounds or polyhydric compounds. The composition according to WO2001/08784 is, according to the examples, used to impregnate a solid cardboard support to provide a cardboard support with desiccating properties.

WO2014/051652 describes a method for synergistic desiccation by using a mixture of at least one humidity attracting substance and at least one polymeric substance. The humidity attracting substance can, amongst others, be phosphorous oxide, sodium silicate, potassium silicate, potassium acetate, bentonite, montmorillonite clay, silica gel, molecular sieve, monohydric compounds, polyhydric compounds, calcium chloride, cobalt chloride and polysaccharides such as starch and cellulose. The polymeric substance can be cellulose, paper, paper products, wood fiber, paperboard, corrugated paper products and various other polymeric products.

According to the example an aqueous solution of calcium chloride is applied to the surface of a dry paperboard where after the paperboard is dried. The treated paperboard can be used as a desiccant.

The above references disclose composite desiccants for single use. After use the desiccants are disposed.

A disadvantage of many known composite desiccant materials is that it can be difficult to determine the saturation level of the desiccant, unless chemical indicators such as cobalt chloride are added. Cobalt chloride is for example a known carcinogen.

Furthermore, known desiccants were found to be difficult to mold into desirable shapes, and cannot be regenerated.

SUMMARY OF THE INVENTION

There is a need for a desiccant which can be regenerated and reused and which can absorb a large amount of moisture a number of times.

The present inventors have therefore found it necessary to develop a moldable desiccant that could overcome the drawbacks of the known desiccants.

The invention relates to a reaction product of a mixture of components suitable for molding into shaped desiccant particles, wherein the mixture comprises:
  a) a porous siliceous material,
  b) hygroscopic salt,
  c) polyvinyl alcohol (PVA) with a degree of hydrolysis between 82 and 95 mol % and a viscosity between 12 and 40 mPa·s, as determined on an aqueous solution of 4% PVA at 20° C. according to DIN53015,
  d) water,
  e) optionally an OH-containing polymer, different from PVA,
wherein the weight ratio between hygroscopic salt and the porous siliceous material is chosen between 0.1:1 and 0.9:1 and
wherein the weight ratio between hygroscopic salt and PVA is chosen between 1:1 and 5:1.

The mixture of components suitable for molding into shaped desiccant particles is a precursor for (dry) desiccant particles, or desiccant precurs The invention also relates to dry desiccant particles that comprise the reaction product of a mixture of components according to the invention comprising:
  a) a porous siliceous material,
  b) hygroscopic salt,
  c) polyvinyl alcohol (PVA) with a degree of hydrolysis between 82 and 95 mol % and a viscosity between 12 and 40 mPa·s, as determined on an aqueous solution of 4% PVA at 20° C. according to DIN53015,
  d) water,
  e) optionally an OH-containing polymer, different from PVA,
wherein the weight ratio between hygroscopic salt and the porous siliceous material is chosen between 0.1:1 and 0.9:1,
wherein the weight ratio between hygroscopic salt and PVA is chosen between 1:1 and 5:1, and wherein dry desiccant particles are obtained by molding (forming) and subsequently heating the reaction product at a temperature between 120 and 200° C. during a time sufficient to prepare dry desiccant particles having less than 10 wt. % water relative to the total weight of the dry desiccant particles.

DETAILED DESCRIPTION OF THE INVENTION

It is recognized by the inventors that the heating time and temperature required to cure the reaction product may vary as it depends on multiple variables, such as for example the mass of the molded dry desiccant particles and the particle size.

The mixture of components to prepare the reaction product comprises a porous siliceous material, hygroscopic salt, PVA, water, and an optional OH-containing polymer, different from PVA.

It was observed that the reaction product forms a moldable mass that can be kneaded and formed into particles and that said molded particles can subsequently be cured at elevated temperatures to evaporate water and solvents and in order to provide dry desiccant particles. The curing process dehydrates the reaction product and results in partial glass transition of the PVA. After curing the cured desiccant particles are rigid, porous and resist deforming.

The dry desiccant particles can adsorb humidity during use, whereby hydrated particles are formed. The desiccant particles according to the invention can reversibly adsorb humidity from the air.

It was observed that fully hydrated desiccant particles have a water content of over 40 wt. % based on the total weight of the dry desiccant particles. Preferably, the water content of fully hydrated desiccant particles is 75-160 wt. % of the dry desiccant particles, more preferably 85-120 wt. %, most preferably 90-115 wt. %.

The hydrated desiccant particles according to the invention can be thermally regenerated, removing a substantial percentage of the adsorbed water, without substantial disintegration of the desiccant particles. After regeneration, the ability of the dry desiccant particles to adsorb moisture has been restored to a large extent. The ability of the dry desiccant particles to absorb moisture typically is at least 90% relative to the previous adsorption/desorption cycle. The adsorption and desorption cycle of desiccant particles can be performed multiple times, for example at least 10 times.

Commercially available desiccant particles comprising calcium chloride and other hygroscopic salts have the disadvantage that the adsorbed water solubilizes the deliquescent salt and the solubilized salt will leach out of the desiccant mass. The inventors surprisingly discovered that the hygroscopic salt does not leach out of the hydrated desiccant particles according to the present invention when water is adsorbed, or at least leaching takes place to a lesser extent.

Reaction Product

The reaction product can be formed by mixing a solution of PVA, and optionally an OH-containing polymer different from PVA, in water with hygroscopic salt and subsequently with the siliceous material under stirring. The reaction of PVA and optionally the OH-containing polymer different from PVA, with the hygroscopic salt generates heat and the obtained product has the characteristics of a gummy material. The porous siliceous material is thereafter added to the aforementioned gummy material and the obtained reaction product can thereafter be kneaded to homogenize the ingredients. The reaction product has the characteristics of a thick paste and can be molded (formed) into individual particles, like beads, of any size. Preferably, substantially spherical particles are molded. Preferably, the average diameter of the particles is 0.1 mm-7 mm, more preferably 2.5 mm-4.5 mm, most preferably 3mm-5 mm.

Hygroscopic Salt

The mixture of components comprises a hygroscopic salt.

The hygroscopic salt may contain different components. Examples of hygroscopic salts are $CaCl_2$, $MgCl_2$, $MgSO_4$ and LiCl.

Preferably the hygroscopic salt component consists of >70 wt. % $CaCl_2$, having a purity above 50 wt. %, more preferably above 60 wt. %, most preferably above 70 wt. %, more preferably the hygroscopic salt component consists of >90% $CaCl_2$, having a purity above 70 wt. %.

$CaCl_2$ is a deliquescent salt which is solid at room temperature. $CaCl_2$ can adsorb large amounts of water relative to its own weight. Optionally hygroscopic salts other than $CaCl_2$, such as for example $MgSO_4$ or $MgCl_2$ can be added to the hygroscopic salt component.

The mixture of components preferably comprises 10-30 wt. % hygroscopic salt, more preferably 12-28 wt. % hygroscopic salt, most preferably 15-25 wt. % hygroscopic salt, based on the total weight of the mixture of components.

The weight ratio in the mixture of components between the hygroscopic salt and the porous material is chosen between 0.1:1 and 0.9:1, preferably between 0.2:1 and 0.8:1, more preferably between 0.25:1 and 0.75:1.

PVA

The mixture of components comprises polyvinyl alcohol (PVA). The PVA in the mixture of components according to the invention is partially hydrolyzed polyvinyl alcohol.

PVA can be prepared by polymerizing vinyl acetate and thereafter converting the obtained polyvinyl acetate to PVA. Conversion can be performed by a hydrolyses reaction in the presence of a base, for example NaOH. When PVA is completely hydrolyzed it has the structural formula $[CH_2CH(OH)]_n$. However, for the purpose of the invention PVA should not be completely hydrolyzed. The PVA that can be used according to the invention has a degree of hydrolysis between 82 and 95 mol %. Preferably, the degree of hydrolysis is between 83 and 93 mol %, more preferably between 84 and 90 mol %.

During the production of the reaction product PVA needs to be dissolved in water. When the degree of hydrolysis of the PVA is below 82 mol % the PVA is not readily soluble in water. When the degree of hydrolysis is above 98 mol % the polymer does not sufficiently react with the hygroscopic salt and a paste or gummy cannot be formed. Without wanting to be bound by any theory, the inventors have the hypothesis that with an increasing degree of hydrolysis PVA becomes hydrophobic. PVA reshapes to a micelle-like structure wherein all OH— groups orientate towards the inside of the micelle, making them unavailable for a reaction with the hygroscopic salt.

PVA can have a viscosity between 12 and 40 mPa·s, as determined on an aqueous solution of 4% PVA at 20° C. according to DIN53015, preferably the viscosity of PVA is 13-37 mPa·s, more preferably 14-35 mPa·s, most preferably 15-32 mPa·s.

PVA can, for example, have a weight average molecular weight (Mw) above 70,000 g/mol, preferably above 100,000 g/mol.

PVA has a weight average molecular weight below 1,000,000 g/mol, preferably below 500,000 g/mol and more preferably below 300,000 g/mol. In particular, PVA has a weight average molecular weight between 100,000 and 300,000 g/mol. The weight average molecular weight ($M_w$) is determined by gel permeation chromatography (GPC) using laser scattering techniques.

The inventors have found that a minimum viscosity and hydrolysis degree are required to form a network of interconnected chains through hydrogen bonding. PVA with lower hydrolysis rate is known to have too many residual acetate groups for sufficient hydrogen bonds to form between the chains. It was observed that when PVA types with relatively high viscosity are selected, a moldable reaction product can be obtained. Higher viscosity is known to indicate longer polymer chains and an increase in the likelihood of bonding between the chains. As hygroscopic salt is added to the solution the viscosity of the solution can be observed to increase further and the desired paste or gummy material can be obtained.

The mixture of components preferably comprises 1-20 wt. % PVA, more preferably 1.5-10 wt. % PVA, most preferably 2-8 wt. % PVA, based on the total weight of the mixture of components.

The weight ratio in the mixture of components between hygroscopic salt and PVA is chosen between 1:1 and 10:1, preferably between 1.2:1 and 8:1, more preferably between 1.5:1 and 5:1.

Siliceous Material

The mixture of components comprises a porous siliceous material.

Examples of such porous siliceous materials are inorganic porous materials, like bentonite, zeolite, montmorillonite, $SiO_2$, aluminum silicate, magnesium aluminum silicate, kieselguhr, perlite, molecular sieve, mineral clay, sodium silicate, potassium silicate. Preferably, the porous siliceous material is chosen from the group of $SiO_2$, bentonite or montmorillonite.

$SiO_2$ can, for example, be obtained as spheres with various pore sizes (silica gel). Silica gel is commercially available with various pore sizes, for example with a pore diameter of 2.5 to 4.0 nm; a pore diameter of 4.5-7.0 nm pore or a pore diameter of 8.0-12.0 nm. Preferably, the porous siliceous material is a silica gel with a pore diameter >8.0 nm.

The siliceous material can be ground into smaller particles before use. Grinding can be performed in a manner known to a person skilled in the art; for example by using a pestle and mortar.

The porous siliceous material has a relatively large available surface area for bonding with the PVA-hygroscopic salt solution and allows particles to be formed with sufficiently high structural strength. It is known that the surface of the siliceous material contains silanol sites. Without wanting to be bound by any theory, the inventors have the hypothesis that the PVA-hygroscopic salt solution partly permeates the porous material. When sufficiently heated the PVA becomes more crystalline and strong particles can be formed that resist deformation.

The mixture of components preferably comprises 30-50 wt. % siliceous material, more preferably 32-48 wt. % siliceous material and most preferably 35-45 wt. % siliceous material, based on the total weight of the mixture of components.

OH-Containing Polymer Different from PVA

The mixture of components optionally comprises OH-containing polymer different from PVA. OH-containing polymer different from PVA preferably can be dissolved in water. An OH-containing polymer different from PVA can be a polymer comprising multiple hydroxyl (OH) groups.

Examples of OH-containing polymers different from PVA are oligosaccharides, like kestose and raffinose; polysaccharides, like cellulose, hydroxyethyl cellulose, hydroxypropyl cellulose, amylose, chitin, pectin, starch and alginate; and polyacrylic acid or derivatives of polyacrylic acid.

Preferably, OH-containing polymer different from PVA is chosen from the group of hydroxyethyl cellulose, starch, and polyacrylic acid. OH-containing polymer different from PVA can, for example have a weight average molecular weight above 50,000 g/mol, more preferably above 70,000 g/mol.

Preferably, the OH-containing polymer different from PVA has a weight average molecular weight below 2,000,000 g/mol, more preferably below 1,500,000 g/mol and most preferably below 400,000 g/mol.

In particular, the OH-containing polymer different from PVA has an average molecular weight between 70,000 and 400,000 g/mol.

When OH-containing polymers different from PVA are present the mixture of components preferably comprises 0.01-30 wt. % OH-containing polymer different from PVA, more preferably 0.05-28 wt. % OH-containing polymer different from PVA, most preferably 0.1-25 wt. % OH-containing polymer different from PVA based on the total weight of the reaction product.

The weight ratio in the mixture of components between PVA and OH-containing polymer different from PVA preferably is between 1:1 and 9:1, more preferably between 1.5:1 and 4:1, most preferably between 1.7:1 and 3:1.

In the reaction mixture the PVA and optionally OH-containing polymer different from PVA, dissolved in water, react with the hygroscopic salt during mixing. The inventors have the hypothesis that during this reaction crosslinks are formed between the PVA molecules, optionally the molecules of the OH-containing polymer different from PVA, and hygroscopic salt, and a paste-like product can be formed.

The reaction product can be obtained by mixing the porous siliceous material with the paste-like product that can be formed during the reaction of PVA and, optionally the OH-containing polymer different from PVA, with hygroscopic salt. After mixing and kneading a paste or dough is obtained.

Water

The mixture of components comprises water, which can be preferably present as solvent for the polyvinyl alcohol and optionally OH-containing polymer.

The mixture of components preferably contains between 20 and 59 wt. % water, relative to the total of the mixture, preferably between 25 and 55 wt. %, more preferably between 30 and 50 wt. %.

The water will be present in the reaction product after the reaction between the different components.

The mixture of components preferably comprises:
a) 10-30 wt. % hygroscopic salt,
b) 1-20 wt. % PVA,
c) 30-50 wt. % porous siliceous material, and
d) 20-59 wt. % water, relative to the total weight of the mixture of components. When the mixture of components comprises an OH-containing polymer the mixture of components preferably comprises:
a) 10-30 wt. % hygroscopic salt,
b) 1-20 wt. % PVA,
c) 30-50 wt. % porous siliceous material,
d) 20-58.99 wt. % water, and
e) 0.01-30 wt. % OH-containing polymer, different from PVA, relative to the total weight of the mixture of components.

Molded Desiccant Particles

The invention is also directed to dry desiccant particles obtained by molding (forming) and heating the reaction product of a mixture of components comprising:
a) A porous siliceous material
b) Hygroscopic salt,
c) polyvinyl alcohol (PVA) with a degree of hydrolysis between 82 and 95 mol % and a viscosity between 12 and 40 mPa·s, as determined on an aqueous solution of 4% PVA at 20° C. according to DIN53015,
d) Water, and
e) optionally an OH-containing polymer, different from PVA, at a temperature between 120 and 200° C. during a time sufficient to prepare a dry desiccant, preferably having less than 10 wt. % water relative to the total weight of the dry desiccant.

Thermal curing of the reaction product of the mixture of components may lead to partial elimination of hydroxyl groups in the PVA polymer present in the reaction product and to the formation of polyenes. It was found by the present inventors that the cured product displays a light beige-brown color. As the dry desiccant particles absorb water it was observed that the color gradually changes to a deep orange brown color. This color change from light beige (dry desiccant particles) to deep orange brown (hydrated desiccant particles) can be used as an indication of the water saturation of the desiccant particles.

In a preferred embodiment the dry desiccant particles comprise a reaction product of a mixture of components, wherein the mixture of components comprises:
 a. 10-30 wt. % hygroscopic salt,
 b. 1-20 wt. % PVA,
 c. 30-50 wt. % siliceous material having a pore diameter of larger than 8 nm,
 d. 20-59 wt. % water and
 e. 0-10wt. % OH-containing polymer, different from PVA,
based on the total weight of the mixture of components, wherein dry desiccant particles are obtained by heating the reaction product at a temperature between 120 and 200° C. during a time sufficient to prepare dry desiccant particles having less than 10 wt. % water relative to the total weight of the dry desiccant particles.

In a more preferred embodiment the dry desiccant particles comprise a reaction product of a mixture of components, wherein the mixture of components comprises:
 a. 12-28 wt. % hygroscopic salt,
 b. 2-8 wt. % PVA,
 c. 30-50 wt. % siliceous material having a pore diameter of larger than 8 nm,
 d. 30-50 wt. % water, and
 e. 0-10wt. % OH-containing polymer, different from PVA,
based on the total weight of the mixture of components, wherein dry desiccant particles are obtained by heating the reaction product at a temperature between 120 and 200° C. during a time sufficient to prepare dry desiccant particles having less than 10 wt. % water relative to the total weight of the dry desiccant particles.

Hydrated Desiccant Particles

The invention is further directed to hydrated desiccant particles obtained by water adsorption of the dry desiccant particles defined above.

The adsorption time can vary considerably depending on the size of the particles and the humidity and temperature in the environment of the particles.

Process

The invention is also directed to a process for the production of the precursor for desiccant particles comprising the steps of:
 a) Dissolving PVA with a degree of hydrolysis between 82 and 95 mol % in water to prepare a PVA solution,
 b) Optionally adding a solution of OH-containing polymer, different from PVA, to the PVA solution,
 c) Adding hygroscopic salt to the PVA and optional OH-containing polymer, different from PVA, solution to provide a paste A
 d) Mixing and kneading paste A with a porous siliceous material to provide the reaction product.

Preferably steps a, b and c are carried out before step d.

The PVA and, optional, OH-containing polymer can be dissolved in water by mixing and stirring. Optionally, the mixture of PVA or OH-containing polymer with water can be heated to dissolve the PVA or OH-containing polymer in water.

Preferably, the PVA solution comprises 5-20 wt. % PVA, more preferably 7-18 wt. % PVA, based on the total weight of PVA and water.

Preferably, the solution of the OH-containing polymer comprises 5-20 wt. % OH-containing polymer, more preferably 7-18 wt. % OH-containing polymer based on the total weight of OH-containing polymer, different from PVA, and water.

During the process the PVA and optionally the OH-containing polymer different from PVA, dissolved in water, react with the hygroscopic salt during mixing and a paste A is formed.

The reaction product can be obtained by mixing and kneading the porous siliceous material with paste A. The reaction product is preferably also a paste.

Mixing and kneading can be performed in industrial mixers and kneaders known in the art. For example, an extruder can be used. The temperature during mixing and kneading can be room temperature. The mixing and kneading can also be performed at a raised temperature, for example at a temperature that is below 50° C.

The temperature of mixing and kneading ranges preferably between 20 and 80° C., more preferably between 22 and 50° C.

The invention is also directed to a process for the production of dry desiccant particles comprising the steps of:
 a) Dissolving PVA with a degree of hydrolysis between 82 and 95 mol % in water to prepare a PVA solution,
 b) Optionally adding a solution of OH-containing polymer, different from PVA, to the PVA solution,
 c) Adding hygroscopic salt to the PVA and optional OH-containing polymer, different from PVA, solution to provide a paste A
 d) Mixing and kneading paste A with a porous siliceous material to provide the reaction product,
 e) Forming particles from the reaction product, and
 f) Heating the particles at a temperature between 120 and 200° C. during a time sufficient to prepare dry desiccant particles having less than 10 wt. % water relative to the total weight of the dry desiccant particles.

Steps a) to d) are identical to the steps of making the precursor for the dry desiccant particles.

Particles can be formed by the usual apparatus, for example in the extruder.

Heating of the particles can for example be performed in an oven, a fluid bed or other suitable devices. A preferred heating temperature ranges between 125 and 195° C., more preferably between 130 and 190° C. When the heating temperature is too low (for example below 120° C.), the dry desiccant particles are not strong enough and the particles may disintegrate when hydrated desiccant particles are regenerated in a microwave oven.

The heating time varies depending on the size of the particles and the temperature.

The heating time can be chosen between 30 seconds to 168 hours, more preferably between 1 hour to 96 hours, most preferably between 2 hours to 48 hours.

Use

The dry desiccant particles comprising the reaction product according to the invention can be used for the adsorption of moisture. The adsorption of moisture can be performed in a closed space, for example in a room or a container. Depending on the size of the closed space and the humidity in the closed space the amount of dry desiccant particles can vary. The dry desiccant particles can also vary in size. During use the dry desiccant particles adsorb moisture. The dry desiccant particles according to the invention can adsorb 40-130 wt. % of water, based on the total weight of the dry desiccant particles, preferably 80-125 wt. %, more preferably 85-120 wt. %, most preferably 90-115 wt. %.

Regeneration

The invention is further directed to a process for the regeneration of hydrated desiccant particles, wherein the hydrated desiccant particles are regenerated by the removal of the adsorbed water from the hydrated desiccant particles. Regeneration can be performed until a substantial part of the water in the hydrated desiccant particles has been evaporated and dry desiccant particles have been formed. Regeneration until substantially all water has been evaporated means that after regeneration the amount of water in the regenerated dry desiccant particles is 0-10 wt. % based on the total weight of the dry desiccant particles, preferably 0-5 wt. %, more preferably 0-1 wt. %, most preferably 0-0.5 wt. %.

Regeneration can be performed in various ways. For example, by heating, by bringing the hydrated desiccant particles under vacuum and by treating the hydrated desiccant particles in a microwave oven. Preferably, the regeneration takes place in a microwave. The regeneration in a microwave causes forces within the desiccant particles which tend to destroy the particles (erosion). The desiccant particles according to the invention can withstand these forces, so that the amount of erosion is minimal, for example less than 10 wt. % in each drying cycle of the total weight of the dry desiccant particles.

Heating can be performed at a raised temperature, for example a temperature above 25° C., preferably at a temperature above 50° C. Preferably, the temperature is below 180° C.

Regeneration is preferably performed in a microwave oven. The power of the microwave oven is preferably set between 200 and 1200 W.

Regeneration preferably is performed for a period between 30 seconds to 24 hours, more preferably between 1 minute to 12 hours, most preferably between 2 minutes to 1 hour.

Regeneration of the hydrated desiccant particles, also in the microwave oven, can be performed without substantial disintegration of the particles.

The absorption and regeneration cycle can be performed multiple times, preferably at least 2 times, more preferably at least 5 times, most preferably at least 10 times.

It is noted that the invention relates to all possible combinations of features described herein, preferred in particular are those combinations of features that are present in the claims. It will therefore be appreciated that all combinations of features relating to the composition according to the invention; all combinations of features relating to the process according to the invention and all combinations of features relating to the composition according to the invention and features relating to the process according to the invention are described herein.

It is further noted that the term 'comprising' does not exclude the presence of other elements. However, it is also to be understood that a description on a product/composition comprising certain components also discloses a product/composition consisting of these components. The product/composition consisting of these components may be advantageous in that it offers a simpler, more economical process for the preparation of the product/composition. Similarly, it is also to be understood that a description on a process comprising certain steps also discloses a process consisting of these steps. The process consisting of these steps may be advantageous in that it offers a simpler, more economical process.

The invention is now elucidated by way of the following examples, without however being limited thereto.

EXAMPLES

Components
Siliceous Material
Silica Gel: macroporous, average pore diameter 80-110Å. (Caldic)
Bentonite: Bentonite (Sigma Aldrich)
Fumed Silica: Fumed Silica S5505 (Sigma Aldrich)
Hygroscopic Salt
Calcium Chloride, $CaCl_2$, anhydrous, granular ≤7.0 mm, ≥93.0% (Sigma-Aldrich)
Magnesium sulphate, $MgSO_4$, granular, anhydrous, ≥97% (Honeywell)
Polyvinyl Alcohol/PVA
Various types of polyvinyl alcohol (PVA) were tested. All types of PVA were obtained from Kuraray. The PVA was used as a 10 wt. % solution of the PVA in de-ionised water. The viscosity of the PVA types was determined according to DIN53015 on an aqueous solution of 4% PVA at 20° C.

| PVA type | Hydrolysis degree (%) | Viscosity (mPa · s/ 4% in H2O) | Mw (g/mol) |
| --- | --- | --- | --- |
| Mowiol ® 18-88 | 88 | 18 | 130,000 |
| Mowiol ® 23-88 | 88 | 23 | 150,000 |
| Mowiol ® 3-80 | 80 | 3 | 14,000 |
| Mowiol ® 4-88 | 88 | 4 | 31,000 |
| Mowiol ® 8-88 | 88 | 8 | 67,000 |
| Mowiol ® 4-98 | 98 | 4 | 27,000 |
| Mowiol ® 10-98 | 98 | 10 | 61,000 |

OH-Containing Polymer, Different from PVA
Hydroxyethylcellulose (HEC): Natrosol® 250GR (Ashland)
Polyacrylic acid (FAA), 30% solution (Sigma Aldrich)
Na-Alginate: Protaweld® EVR200 (FMC BioPolymer)
The OH-containing polymer was used as a 10 wt. % solution of the OH-containing polymer in de-ionised water.
Process
Preparing the Siliceous Material
The silica gel was crushed. Smaller sized silica gel particles were prepared by crushing the silica gel in a pestle and mortar into a powder. The powder could be optionally sieved to eliminate dust. The obtained powder was dried 4 hours in an oven at 100° C. Bentonite was obtained as a dry powder and did not need to be crushed.
Preparation of a PVA and Optional OH-Containing-Polymer, Different from PVA, Solution
In glass beakers PVA powder and optional OH-containing-polymer were weighed and de-ionized water was added. The beakers were then placed on a heating plate between 85 and 90° C. with constant stirring. After about 3 hours, the PVA and OH-containing polymer were completely dissolved and clear solutions were obtained. Water was evaporated until the desired concentration remains (e.g. 10% PVA solution). Stirring was maintained while cooling down in order to avoid skin formation. Optionally, the solution of OH-containing polymer, different from PVA, was added to the PVA solution.
Addition of Hygroscopic Salt
Hygroscopic salt was added to the PVA solution and optional OH-containing polymer solution under stirring. For many solutions, a strong exothermic reaction was observed upon addition and dissolution of the hygroscopic salt. Very thick and gummy-like pastes were obtained.

Preparation of the Siliceous Material-Hygroscopic Salt Product

The siliceous material was slowly added to the obtained paste. This was done by stirring and kneading pastes. In some cases it was needed to add extra water because of the dryness of the pastes.

Preparation of Particles and Drying

Particles were formed from the paste. The particles were shaped into particles with an average size of 3 to 5 mm diameter and were dried in an oven at 150° C. for 24 hours.

Water Uptake by the Particles

The dry particles were placed for 24 hours in a climate chamber with a relative humidity of 75% and a temperature of 40° C. The water uptake of the dry particles was examined. Additional tests were optionally performed at relative humidity (RH) 85% and 99%.

Regeneration of the Particles

After the dry particles took up water the hydrated particles were regenerated by treating the hydrated particles in a glass beaker in a microwave at 595 W. Weight loss and appearance was monitored after each cycle of 30 seconds. The hydrated particles were treated for 10 cycles of 30 seconds.

EXAMPLES

Various dry desiccant particles were prepared as described above and the water-absorbing properties of the dry desiccant particles and the regeneration of the hydrated desiccant particles were tested. The results are given below in Tables I and II.

TABLE I

| | Example | | | | | | | | | |
|---|---|---|---|---|---|---|---|---|---|---|
| | 1 | 2 | 3 | 4 | 5 | 6 | 7 | 8 | 9 | 10 |
| Mowiol ®18-88 solution ** | 39.37 | | | | | | | | | |
| Mowiol ® 23-88 solution ** | | 39.37 | 45.00 | 39.37 | 27.56 | 27.56 | 19.69 | 35.43 | 37.46 | 35.43 |
| CaCl$_2$ | 19.69 | 19.69 | 14.06 | 19.69 | 19.69 | 19.69 | 19.69 | 19.69 | 18.57 | 17.72 |
| Siogel ® White Silica | 40.94 | 40.94 | 40.94 | | 40.94 | 40.94 | 40.94 | 40.94 | 38.85 | 36.85 |
| Bentonite | | | | 40.94 | | | | | | |
| HEC solution ** | | | | | 11.81 | | 19.68 | 3.94 | | |
| PAA solution ** | | | | | | 11.81 | | | | |
| MgSO$_4$ | | | | | | | | | 5.02 | 10.00 |
| Total | 100 | 100 | 100 | 100 | 100 | 100 | 100 | 100 | 100 | 100 |
| Water content wt. % | 35.4 | 35.4 | 40.5 | 35.4 | 35.4 | 35.4 | 35.4 | 35.4 | 33.7 | 31.9 |
| Test results | | | | | | | | | | |
| Particle formation | + | + | + | + | + | + | + | + | + | + |
| Color of particles | + | ± | + | + | + | + | + | ± | + | + |
| Water uptake (wt. %) | 88.0 | 112.0 | 84.4 | 65.79 | 95.75 | 103.97 | 98.41 | 98.65 | 63.0 | 60.1 |
| Leaching out | ± | ± | + | + | + | + | + | + | ± | + |
| Regeneration | + | + | + | ± | ± | ± | − | − | + | + |
| Color change | + | + | + | + | + | + | + | + | + | + |

** added as a 10 wt. % solution in water.

TABLE II

| | Comparative experiment | | | | | | | | | |
|---|---|---|---|---|---|---|---|---|---|---|
| | A | B | C | D | E | F | G | H | I | J |
| Mowiol ® 23-88 solution ** | 50.00 | 39.37 | | | | | | 39.37 | 27.56 | |
| Mowiol ® 4-98 solution ** | | | 39.37 | | | | | | | |
| Mowiol ® 10-98 solution ** | | | | 39.37 | | | | | | |
| Mowiol ® 4-88 solution ** | | | | | 39.37 | | | | | |
| Mowiol ® 8-88 solution ** | | | | | | 39.37 | | | | |
| Mowiol ® 3-80 solution ** | | | | | | | 39.37 | | | |
| CaCl$_2$ | 9.07 | 36.38 | 19.69 | 19.69 | 19.69 | 19.69 | 19.69 | 19.69 | 19.69 | 19.69 |
| Siogel ® White Silica | 40.94 | 24.25 | 40.94 | 40.94 | 40.94 | 40.94 | 40.94 | | | 40.94 |
| Fumed Silica | | | | | | | | 40.94 | | |

TABLE II-continued

| | Comparative experiment | | | | | | | | | |
|---|---|---|---|---|---|---|---|---|---|---|
| | A | B | C | D | E | F | G | H | I | J |
| Na-Alginate solution ** | | | | | | | | | 11.81 | |
| HEC solution ** | | | | | | | | | | 39.37 |
| Total | 100 | 100 | 100 | 100 | 100 | 100 | 100 | 100 | 100 | 100 |
| Water content wt. % | 45 | 35.4 | 35.4 | 35.4 | 35.4 | 35.4 | 35.4 | 35.4 | 35.4 | 35.4 |
| Test results | | | | | | | | | | |
| Particle formation | − | − | − | − | ± | ± | − | − | − | − |
| Problem during particle formation | Very sticky | Brittle | Brittle | Brittle | Brittle | Brittle | Brittle | Sticky | No reaction between $CaCl_2$ and Na-Alginate | Brittle |

** added as a 10 wt. % solution in water

Particle Formation
   +=good particle formation possible
   ±=difficult to form particles, sometimes extra water addition needed
   _=no particles can be formed
Color of Particles
   This is the color of the particles after drying.
   +=white to beige particles
   ±=brown particles
   _=dark brown to black particles
Water Uptake
   The water uptake is given as wt. % water based on the total weight of the reaction product of hygroscopic salt, PVA, the porous material and optionally the OH-containing polymer in the dry particles.
Leaching Out
   +=no leaching after water uptake
   ±=slight leaching out after water uptake
   _=leaching out after water uptake
Regeneration
   +=regeneration possible
   ±=some degradation during regeneration
   _=particles disintegrate during regeneration
Color Change
   +=Self indicating, particle color changes from light to dark as water is adsorbed
   −=Not self indicating, particle color does not change as water is adsorbed
Results Various types of PVA were tested. With Mowiol® 18-88 and 23-88 it was possible to prepare good dry desiccant particles. The degree of hydrolysis of the PVA should be high enough for the PVA to react with the hygroscopic salt. When the degree of hydrogenation is too high reaction with the hygroscopic salt is also not possible and no plasticizing effect could be observed. The plasticizing effect, which is required for good particle formation, does not sufficiently occur (see Comparative Experiments C, D and G).

The viscosity of the PVA is also important. The PVA types Mowiol® 4-88 and 8-88 do not give good results, because the viscosity of the PVA is too low (see Comparative Experiments E and F).

Other types of hygroscopic salt, such as $MgSO_4$, can be used to (partially) substitute $CaCl_2$. $MgSO_4$ was selected for testing as it is a known drying agent and magnesium and alkali salts are often found as impurities in industrial grade $CaCl_2$. $MgSO_4$, was tested and it was observed that, while the adsorption capacity was decreased compared to experiments utilising $CaCl_2$ only, functional desiccant particles that can be thermally regenerated could still be obtained (Examples 9 and 10).

Addition of an —OH containing polymer, HEC or PAA, improves the leaching properties of the hydrated desiccant particles. The hydrated desiccant particles showed no or only slight leaching after absorption of water. When PVA was completely replaced by HEC no particles could be formed (Comparative Experiment J).

With Na-alginate no reaction took place with $CaCl_2$ and no particles could be formed (Comparative Experiment I).

With the materials Siogel® and bentonite, which are both porous silicious materials, it was possible to prepare good dry desiccant particles.

When fumed silica powder, a non-porous material, was used no dry desiccant particles could be formed (Comparative Experiment H).

The amount of siliceous material should be higher than the amount of $CaCl_2$. Otherwise no dry desiccant particles can be formed (Comparative Experiment B).

The amount of PVA solution versus the amount of hygroscopic salt can vary (Examples 2 and 3), but cannot be too high. A sticky material will be formed which cannot be shaped into dry desiccant particles (Comparative Experiment A).

Surprisingly, the inventors found that the desiccant particles obtained in Examples 1-10 all resulted in self indicating desiccant particles, that displayed a clearly distinguishable color change between the dry state and the hydrated state of the desiccant particle, upon adsorption of humidity. All samples gradually changed color from a light beige or light brown color (dry state), to an orange brown color (partially hydrated) and finally to a very dark brown color (fully hydrated).

The invention claimed is:
1. Reaction product of a mixture of components suitable for molding into shaped desiccant particles, wherein the mixture comprises:
   a. a porous siliceous material,
   b. hygroscopic salt,
   c. polyvinyl alcohol (PVA) with a degree of hydrolysis between 82 and 95 mol % and a viscosity between 12 and 40 mPa·s, as determined on an aqueous solution of 4% PVA at 20° C. according to DIN53015, d. water, e. optionally, an OH-containing polymer, different from PVA, wherein the weight ratio between hygroscopic salt and the porous siliceous material is chosen between 0.1:1 and 0.9:1 and wherein the weight ratio between hygroscopic salt and PVA is chosen between 1:1 and 5:1.

2. The reaction product according to claim 1, wherein the hygroscopic salt component comprises >70 wt. % $CaCl_2$, having a purity above 50 wt. %.

3. The reaction product according to claim 1, wherein the OH-containing polymer, different from PVA, is chosen from the group of hydroxyethyl cellulose, starch, and polyacrylic acid.

4. The reaction product according to claim 1, wherein the weight ratio in the mixture of components between PVA and the OH-containing polymer, different from PVA, is between 1:1 and 9:1.

5. The reaction product according to claim 1, wherein the mixture of components comprises:

a. 10-30 wt. % hygroscopic salt,
b. 1-20 wt. % PVA,
c. 30-50 wt. % porous siliceous material, and
d. 20-59 wt. % water, relative to the total weight of the mixture of components.

6. The reaction product according to claim 1, wherein the mixture of components comprises the OH-containing polymer and the mixture of components comprises:

a. 10-30 wt. % hygroscopic salt,
b. 1-20 wt. % PVA,
c. 30-50 wt. % porous siliceous material,
d. 20-58.99 wt. % water and
e. 0.01-30 wt. % OH-containing polymer, different from PVA, relative to the total weight of the mixture of components.

7. A process for the production of the reaction product according to claim 1, comprising the steps of:

a. Dissolving PVA with a degree of hydrolysis between 82 and 95 mol % and a viscosity between 12 and 40 mPa·s, as determined on an aqueous solution of 4% PVA at 20° C. according to DIN53015, in water to prepare a PVA solution, b. Optionally adding a solution of OH-containing polymer, different from PVA, to the PVA solution, c. Adding hygroscopic salt to the PVA and optional OH-containing polymer, different from PVA, solution to provide a paste A, d. Mixing and kneading paste A with a porous siliceous material to provide the reaction product, wherein step d is performed after steps a, b and c.

8. A process for the production of dry desiccant particles, comprising providing the reaction product according to claim 7 and e. Forming particles from the reaction product, and f. Heating the particles at a temperature between 120 and 200° C. during a time sufficient to prepare dry desiccant particles having less than 10 wt. % water relative to the total weight of the dry desiccant particles.

* * * * *